United States Patent
Chen

(10) Patent No.: US 8,249,154 B2
(45) Date of Patent: Aug. 21, 2012

(54) METHOD AND APPARATUS FOR ENCODING/DECODING IMAGE BASED ON INTRA PREDICTION

(75) Inventor: Jianle Chen, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 12/402,716

(22) Filed: Mar. 12, 2009

(65) Prior Publication Data

US 2009/0232207 A1    Sep. 17, 2009

(30) Foreign Application Priority Data

Mar. 12, 2008  (KR) .................... 10-2008-0022994

(51) Int. Cl.
*H04N 11/02* (2006.01)
*H04N 7/32* (2006.01)
*H04N 7/34* (2006.01)

(52) U.S. Cl. .......... 375/240.12; 375/240.13; 375/240.24

(58) Field of Classification Search . 375/240.01–240.27
See application file for complete search history.

(56) References Cited

U.S. PATENT DOCUMENTS

| 2005/0008232 A1* | 1/2005 | Shen et al. ................ 382/233 |
| 2005/0013370 A1* | 1/2005 | Kim et al. ............... 375/240.16 |
| 2007/0053433 A1* | 3/2007 | Song ..................... 375/240.13 |

FOREIGN PATENT DOCUMENTS

| JP | 9-331526 A | 12/1997 |
| JP | 2006-135786 A | 5/2006 |
| KR | 10-2005-0009216 A | 1/2005 |

OTHER PUBLICATIONS

Liu et al. ("Enhanced intra prediction using context-adaptive linear prediction", Picture Coding Symposium, Nov. 7, 2007, Lisboa, Portugal).*
Sohn et al. ("One dimensional transform for H.264 based intra coding", Picture Coding Symposium, Nov. 7, 2007, Lisboa, Portugal).*

* cited by examiner

*Primary Examiner* — Joseph Ustaris
*Assistant Examiner* — On S Mung
(74) *Attorney, Agent, or Firm* — Sughrue Mion, PLLC

(57) ABSTRACT

Provided are an intra prediction-based encoding method, and an apparatus for accomplishing the same. In the method, a linear prediction coefficient of a current block is calculated based on encoded blocks adjacent to the current block, a predicted block is generated by performing intra prediction on the current block by using a linear prediction coefficient, and a residual block that is the difference between the current block and the predicted block is encoded. Accordingly, information regarding a direction of intra prediction does not need to be additionally transmitted, thereby reducing the amount of bits that are to be transmitted, and the quality of an image can be improved by adaptively controlling the efficiency and precision of intra prediction.

20 Claims, 10 Drawing Sheets

METHOD AND APPARATUS FOR ENCODING/DECODING IMAGE BASED ON INTRA PREDICTION

CROSS-REFERENCE TO RELATED PATENT APPLICATIONS

This application claims priority from Korean Patent Application No. 10-2008-0022994, filed on Mar. 12, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to intra encoding/decoding an image.

2. Description of the Related Art

In video compression methods, such as MPEG (Moving Picture Experts Groups)-1, MPEG-2, and MPEG-4 H.264/MPEG-4 Advanced Video Coding (AVC), a picture is divided into a plurality of macro blocks in order to encode or decode the picture. Next, each of the macro blocks is encoded using inter prediction (temporal prediction) and intra prediction (spatial prediction). Next, an optimal encoding mode is selected in consideration of the data sizes of the encoded macro blocks and the extent of degradation of the original macro blocks, and the macro blocks are encoded according to the optimal coding mode.

In intra prediction, encoding is performed using pixels spatially adjacent to the current block within a current picture without using a reference picture. First, a predicted block of the current block that is to be encoded is generated using the values of the adjacent pixels, and only the difference between the pixel values of the predicted block and the current block is encoded. An intra prediction mode is largely classified into a 4×4 intra prediction mode, an 8×8 intra prediction mode, and a 16×16 intra prediction mode according to luminance components, and an intra prediction mode according to chrominance components.

SUMMARY OF THE INVENTION

The present invention provides an intra prediction-based encoding method and apparatus using a linear prediction method in order to improve the quality of an image through efficient intra prediction, and a computer readable medium having recorded thereon a computer program for executing the above method.

The present invention also provides an intra prediction-based decoding method and apparatus using a linear prediction method in order to improve the quality of an image through efficient intra prediction, and a computer readable medium having recorded thereon a computer program for executing the above method.

According to an aspect of the present invention, there is provided an intra prediction-based encoding method comprising calculating a linear prediction coefficient of a current block, based on encoded blocks adjacent to the current block, generating a predicted block by performing intra prediction on the current block by using the linear prediction coefficient, and encoding a residual block that is a difference between the current block and the predicted block.

According to another aspect of the present invention, there is provided a computer readable storage medium having recorded thereon a computer program for executing an intra prediction-based encoding method, the method comprising calculating a linear prediction coefficient of a current block, based on encoded blocks adjacent to the current block, generating a predicted block by performing intra prediction on the current block by using the linear prediction coefficient, and encoding a residual block that is a difference between the current block and the predicted block.

According to another aspect of the present invention, there is provided an intra prediction-based decoding method comprising reconstructing a residual block that is a difference between a current block and a predicted block and reconstructing information regarding a unit of intra prediction that has been performed on the current block, from a bitstream, calculating a linear prediction coefficient of the current block or in units of lines included in the current block, according to the information regarding the unit of intra prediction, based on encoded blocks adjacent to the current block, generating the predicted block by performing intra prediction on the current block or in units of lines by using the linear prediction coefficient, and reconstructing the current block by combining the predicted block and the reconstructed residual block.

According to another aspect of the present invention, there is provided a computer readable storage medium having recorded thereon a computer program for executing an intra prediction-based decoding method, the method comprising reconstructing a residual block that is a difference between a current block and a predicted block and reconstructing information regarding a unit of intra prediction that has been performed on the current block, from a bitstream, calculating a linear prediction coefficient of the current block or in units of lines included in the current block according to the information regarding the unit of intra prediction, based on encoded blocks adjacent to the current block, generating a predicted block by performing intra prediction on the current block or in units of lines by using the linear prediction coefficient, and reconstructing the current block by combining the predicted block and the reconstructed residual block.

According to another aspect of the present invention, there is provided an intra prediction-based encoding apparatus comprising an intra prediction unit calculating which calculates a linear prediction coefficient of a current block based on encoded blocks adjacent to the current block, and which generates a predicted block by performing intra prediction on the current block by using the linear prediction coefficient, and an encoding unit which encodes a residual block that is a difference between the current block and the predicted block.

According to another aspect of the present invention, there is provided an intra prediction-based decoding apparatus comprising a decoding unit which reconstructs a residual block that is a difference between a current block and a predicted block and which reconstructs information regarding a unit of intra prediction that has been performed on the current block, from a bitstream, an intra prediction unit which calculates a linear prediction coefficient of the current block or in units of lines included in the current block according to the information regarding the unit of intra prediction, based on encoded blocks adjacent to the current block, and then, which generates a predicted block by performing intra prediction on the current block or in units of lines by using the linear prediction coefficient, and an adder which reconstructs the current block by combining the predicted block and the reconstructed residual block.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
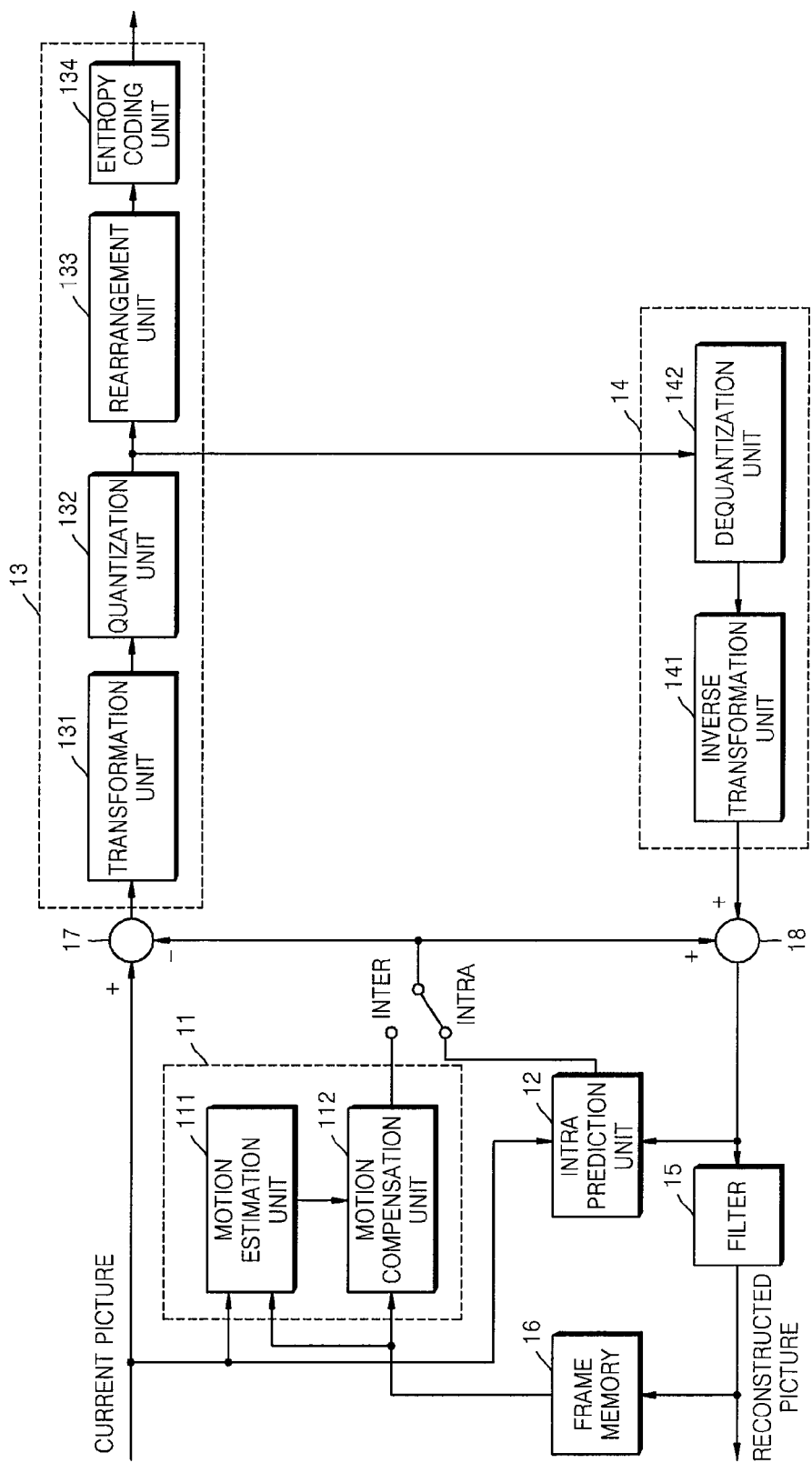
FIG. 1 is a block diagram of an image encoding apparatus including an intra prediction-based encoding apparatus according to an exemplary embodiment of the present invention.

Hereinafter, exemplary embodiments of the present invention will be described in detail with reference to the accompanying drawings. Like reference numerals denote like elements throughout the drawings.

FIG. 1 is a block diagram of an image encoding apparatus including an intra prediction-based encoding apparatus according to an exemplary embodiment of the present invention. An intra prediction-based encoding apparatus according to an exemplary embodiment of the present invention will now be described by applying it to an image encoding apparatus according to the H.264 standard. However, it would be apparent to those of ordinary skill in the art that an intra prediction-based encoding apparatus according to an exemplary embodiment of the present invention can be applied to intra prediction-based image encoding according to various other standards.

Referring to FIG. 1, the image encoding apparatus includes an inter prediction unit 11, an intra prediction unit 12, an encoding unit 13, and a reconstructing unit 14. The image encoding apparatus may further include a filter 15, a frame memory 16, a subtracter 17, and an adder 18. Here, the intra prediction unit 12 and the encoding unit 13 correspond to an intra prediction-based encoding apparatus.

The inter prediction unit 11 includes a motion estimation unit 111 and a motion compensation unit 112. The inter prediction unit 11 performs inter prediction by searching a reference picture stored in the frame memory 16 for a predicted value of a macro block included in a current picture.

The intra prediction unit 12 may obtain a predicted value of a current block by performing linear prediction within the current picture in units of blocks, based on blocks adjacent to the current block. Also, the intra prediction unit 12 may obtain a predicted value of a line included in the current block by performing linear prediction within the current picture in units of lines included in the current block, based on the blocks adjacent to the current block. In linear prediction, the value of a current block is predicted by applying a linear function to a previous sample, i.e., an already encoded block, based on the fact that the similarities between the current block and the blocks adjacent to the current block are high. Here, the current block may be a 4×4 pixel, an 8×8 pixel, or a 16×16 pixel.

According to the H.264 standard, intra prediction is performed on a 16×16 pixel unit according to a total of four prediction modes: a vertical mode, a horizontal mode, a direct current (DC) mode, and a plane mode. Also, intra prediction is performed on a 4×4 pixel unit according to a total of nine prediction modes: a vertical mode, a horizontal mode, a DC mode, a diagonal down-left mode, a diagonal down-right mode, a vertical right mode, a vertical left mode, a horizontal-up mode, and a horizontal-down mode. When directional intra prediction-based encoding is performed on a current block, intra prediction mode information regarding a direction in which intra prediction is to be performed on each block is needed. Thus, a directional intra prediction-based encoding apparatus inserts intra prediction mode information into a bitstream and then outputs the bitstream, and the overall amount of bits that are transmitted increases.

However, in the current exemplary embodiment, the intra prediction unit 12 obtains the predicted value of the current block by performing linear prediction based on pixels included in an encoded block adjacent to the current block based on pixels included in an encoded current block, rather than by performing directional intra prediction using intra prediction mode information. Thus, intra prediction mode information does not need to be additionally transmitted, thereby reducing the amount of bits that are to be transmitted (which will be described in detail later with reference to FIG. 3).

The subtracter 17 generates a residual block by subtracting a predicted block, which is predicted from the current block, from the current block. More specifically, in the case of an inter mode, the subtracter 17 receives a predicted block from the inter prediction unit 11 and subtracts it from the current block. In the case of an intra mode, the subtracter 17 receives a predicted block from the intra prediction unit 12 and subtracts it from the current block.

The encoding unit 13 includes a transformation unit 131, a quantization unit 132, a rearrangement unit 133, and an entropy coding unit 134. The encoding unit 13 encodes the residual block received from the subtracter 17, inserts the result of encoding into a bitstream and then outputs the bitstream.

The transformation unit 131 transforms the residual block received from the subtracter 17 into a frequency component. Here, the transformation unit 131 may transform the residual block into a two-dimensional (2D) frequency component by using discrete cosine transformation (DCT).

More specifically, the transformation unit 131 performs adaptive transformation on units in which the intra prediction unit 12 performs intra prediction. If the intra prediction unit 12 performs linear prediction in units of blocks, the transformation unit 131 adaptively transforms the residual block into a frequency component, according to the sizes of the blocks. If the intra prediction unit 12 performs linear prediction in units of lines included in a block, the transformation unit 131 adaptively transforms the residual block, according to the sizes of the lines, that is, by performing one-dimensional (1D) transformation (which will be described in detail later with reference to FIG. 9).

The reconstruction unit 14 includes an inverse transformation unit 141 and a dequantization unit 142, and reconstructs the residual block by dequantizing and inversely transforming the result of quantizing received from the quantization unit 132.

The adder 18 combines the residual block reconstructed by the reconstruction unit 14 and the predicted block received from the inter prediction unit 11 or the intra prediction unit 12, and outputs the result of combining as a reconstructed current block. The reconstructed current block is stored in the frame memory 16 via the filter 15. Such a value stored in the frame memory 16 is used when the inter prediction unit 11 performs inter prediction or the intra prediction unit 12 performs intra prediction.

Hereinafter, for convenience of explanation, it is assumed that a basic unit in which intra prediction is performed is a 4×4 pixel block. However, it would be apparent to those of ordinary skill in the art that the forthcoming description can also be applied to intra prediction performed in units of 8×8 pixels or 16×16 pixels.

Figure 2A:
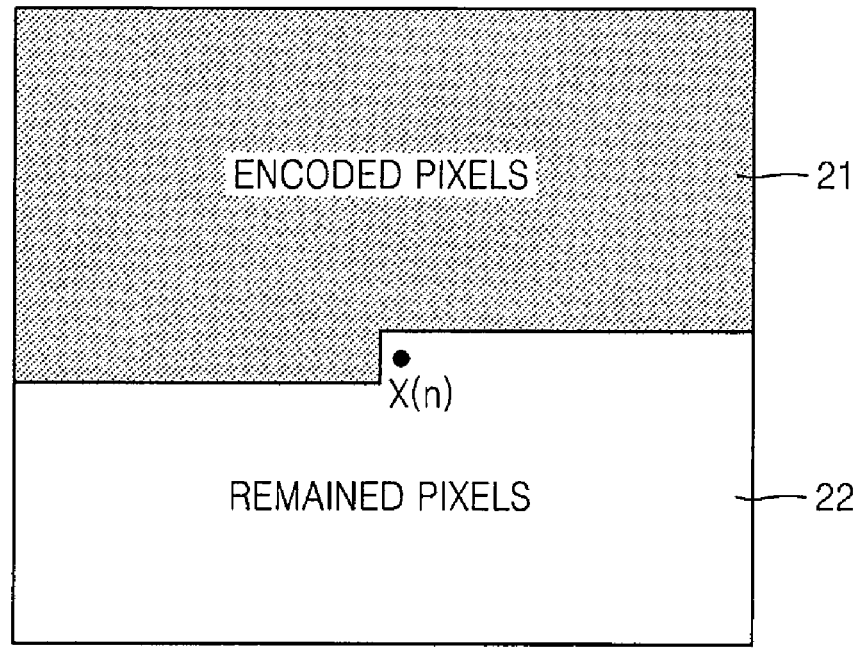
FIGS. 2A and 2B are diagrams illustrating pixel-based linear prediction.
Figure 2B:
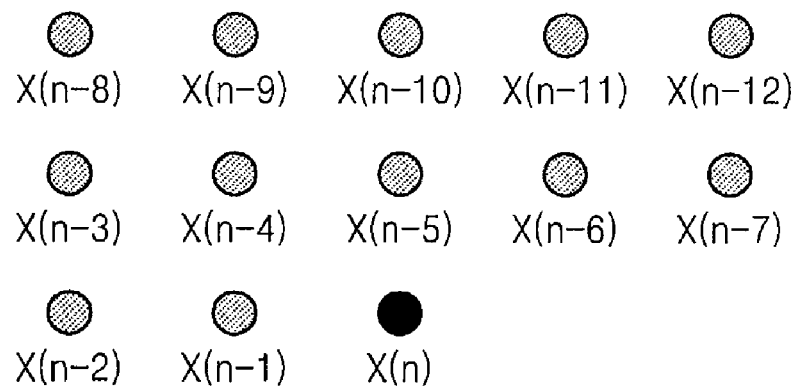

FIGS. 2A and 2B are diagrams illustrating pixel-based linear prediction. Referring to FIGS. 2A and 2B, a current picture may include encoded pixels 21 and remained pixels 22. A predicted value of a current pixel X(n) on which intra prediction-based encoding is to be performed may be calculated using a linear prediction coefficient calculated based on the encoded pixels 21. Since the linear prediction coefficient can be calculated using the encoded pixels 21, there is no need to insert the linear prediction coefficient into the result of encoding a current block and transmit the bitstream, thereby reducing the amount of bits that are to be transmitted.

Here, the linear prediction coefficient may be calculated based on a training window consisting of some pixels adjacent to the current pixel X(n) from among the encoded pixels 21. The training window includes a plurality of pixels X(n−1), X(n−2), X(n−3), X(n−4), X(n−5), X(n−6), X(n−7), X(n−8), X(n−9), X(n−10), X(n−11), and X(n−12).

The following equation denotes a Markovian model for calculating the predicted value of the current pixel X(n):

$$X'(n) = \sum_{k=1}^{n} a(k)X(n-k), \quad (1)$$

wherein X'(n) denotes a predicted value of a current pixel X(n), a(k) denotes a linear prediction coefficient, and n and k are natural numbers equal to or greater than 1. In FIG. 2B, n is 12 and k ranges from 1 to 12.

As described above, in pixel-based linear prediction, the predicted value of the current pixel X(n) can be calculated by applying different linear prediction coefficients in units of pixels, thereby greatly improving the precision of intra prediction and allowing even a decoding terminal to output a high-quality image. However, pixel-based linear prediction is disadvantageous in that intra prediction and transformation must be performed in units of pixels and thus, the amount of calculation of an encoding terminal is large.

Figure 3:
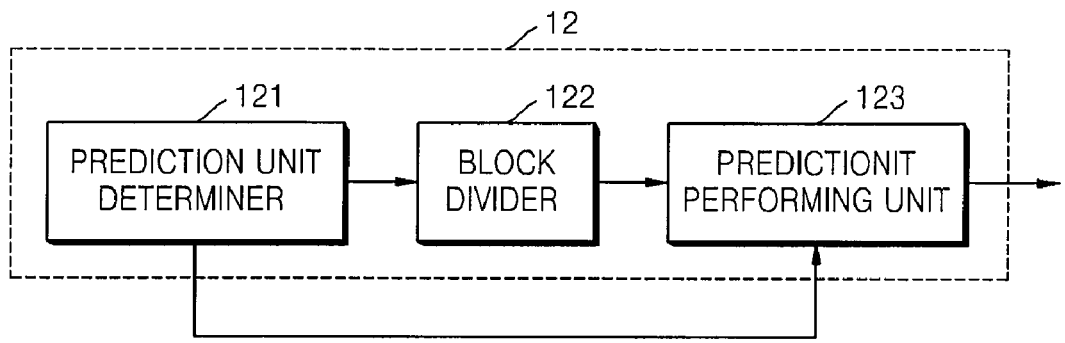
FIG. 3 is a block diagram illustrating in detail an intra prediction unit illustrated in FIG. 1.

FIG. 3 is a block diagram illustrating in detail the intra prediction unit 12 illustrated in FIG. 1. Referring to FIG. 3, the intra prediction unit 12 includes a prediction unit determiner 121, a block divider 122, and a prediction performing unit 123.

The prediction unit determiner 121 determines whether linear prediction is to be performed in units of blocks or units of lines included in each block in intra predicting a current block. If linear prediction is performed in units of blocks, the precision of intra prediction is degraded but the efficiency of intra prediction can be improved since the amount of calculation of intra prediction is reduced. If linear prediction is performed in units of lines, the efficiency of intra prediction is degraded since the amount of calculation increases but the precision of intra prediction can be improved.

Thus, the prediction unit determiner 121 may determine whether linear prediction is to be performed in units of blocks or units of lines, depending on whether the current block contains an edge, the direction of an edge, or a variation in brightness or chrominance within the current block. Here, the edge means a line present in an object, and the boundary of an object is a type of an edge of the object. For example, if an object is a building, an edge may be not only the boundary of the object but also a line expressing the frame of a window present in the building.

Figure 4A:
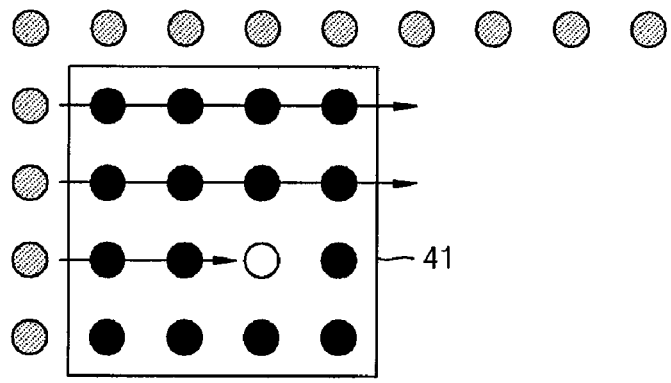
FIGS. 4A and 4B are diagrams illustrating linear prediction performed on a block-by-block basis according to exemplary embodiments of the present invention.
Figure 4B:
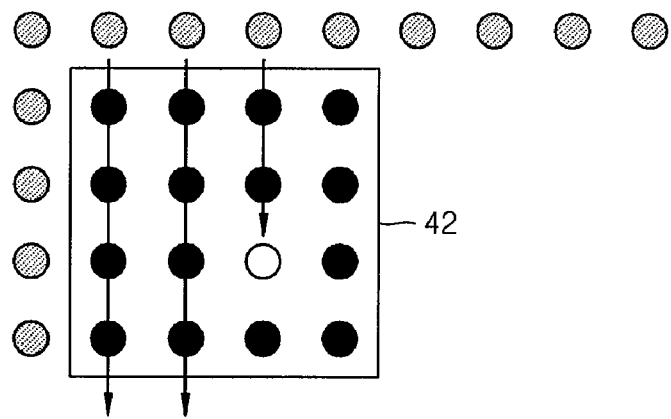

FIGS. 4A and 4B are diagrams illustrating linear prediction performed in units of blocks according to exemplary embodiments of the present invention. Referring to FIGS. 3 and 4A, a current block 41 consists of a plurality of 4×4 pixels indicated in black, and a plurality of pixels indicated in grey around the current block 41 have already been encoded. The prediction unit determiner 121 included in the intra prediction unit 12 may determine linear prediction to be performed on the current block 41 on a block-by-block basis. Here, block size can vary. In detail, although FIG. 4A illustrates the current block 41 as a 4×4 pixel, the size of the current block 41 is not limited.

Intra prediction-based encoding may be performed on a plurality of pixels included in the current block 41 according to the order in which they were scanned. FIG. 4A illustrates intra prediction-based encoding performed according to the order of scanning in the horizontal direction. Thus, a pixel indicated in white may be intra-predicted based on other pixels being intra-predicted in the current block 41.

Referring to FIGS. 3 and 4B, a current block 42 consists of a plurality of 4×4 pixels indicated in black, and a plurality of pixels indicated in grey around the current block 42 have already been encoded. The prediction unit determiner 121 included in the intra prediction unit 12 may determine linear prediction to be performed on the current block 42 on a block-by-block basis. As described above, block size vary.

Intra prediction-based encoding may be performed on a plurality of pixels included in the current block 42 according to the order in which they were scanned. FIG. 4B illustrates intra prediction-based encoding performed according to the order of scanning in the vertical direction. Thus, a pixel indicated in white may be intra-predicted based on other pixels intra-predicted in the current block 42.

Figure 5:
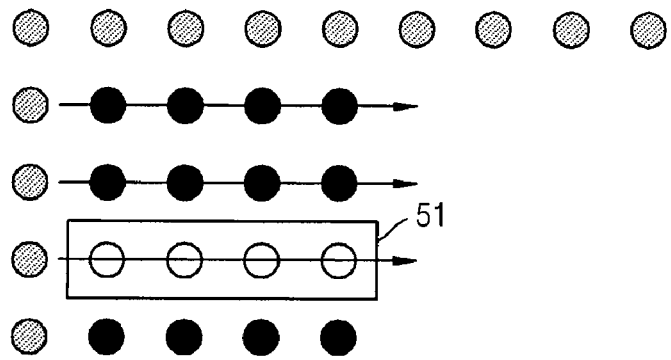
FIG. 5 is a diagram illustrating linear prediction performed on a line-by-line basis according to an exemplary embodiment of the present invention.

FIG. 5 is a diagram illustrating linear prediction performed in units of lines according to an exemplary embodiment of the present invention. Referring to FIGS. 3 and 5, a current block consists of a plurality of 4×4 pixels indicated in black, and a plurality of pixels indicated in grey around the current block have already been encoded. The prediction unit determiner 121 included in the intra prediction unit 12 may determine linear prediction to be performed in units of lines of the current block. The linear prediction illustrated in FIG. 5 will now be described with respect to one line 51 from among four lines of the current block.

If pixel-based linear prediction is performed as illustrated in FIG. 2, the quality of a reconstructed image can be improved since intra prediction can be performed precisely, but the amount of calculation is large since calculation of a linear prediction coefficient and transformation are performed in units of pixels. If linear prediction is performed as illustrated in FIGS. 4A and 4B, the amount of calculation for intra prediction and transformation is small but the precision of intra prediction is degraded. Thus, when precision of intra prediction is required, linear prediction may be performed in units of lines as illustrated in FIG. 5 instead of performing linear prediction in units of blocks as illustrated in FIGS. 4A and 4B.

If linear prediction is performed in units of lines, calculation of a linear prediction coefficient and transformation are also performed in units of lines. Also, intra prediction may be performed on each line in the order of sequential scanning. In other words, it is possible to linear predict pixels included in the line 51 by using the same linear prediction coefficient, and perform linear prediction in the order of sequential scanning, based on intra-predicted pixels from among the pixels included in the line 51.

Here, although linear prediction on the line 51 is performed on a line-by line basis, two lines above the line 51 may be considered one sub block and be linear-predicted using the same linear prediction coefficient. Otherwise, the two lines may be respectively linear-predicted in units of lines, using different linear prediction coefficients.

Referring to FIG. 3, if the prediction unit determiner 121 determines linear prediction to be performed in units of blocks, the block divider 122 divides the current block into at least one sub block with a predetermined size. More specifically, the block divider 122 may directly output the current block without dividing it. For example, the current block is a 16×16 pixel, the block divider 122 may directly output the 16×16 pixel.

Meanwhile, the sizes of the sub blocks may differ from one another. For example, if the current block is a 16×16 pixel, the block divider 122 may divide the current block into a plurality of sub blocks including 2×2 pixels, 4×4 pixels, and 8×8 pixels. Here, it would be apparent to those of ordinary skill in the art that the 2×2 pixels, the 4×4 pixels, and the 8×8 pixels are just examples of the sizes that the sub blocks may have, and the size of the sub blocks may vary.

The prediction performing unit 123 calculates a linear prediction coefficient according to the units in which linear prediction is to be performed, which is determined by the prediction unit determiner 121, and performs linear prediction on the current block by using the linear prediction coefficient.

More specifically, if the prediction unit determiner 121 determines linear prediction to be performed in units of blocks, the prediction performing unit 123 calculates a linear prediction coefficient for each of the sub blocks obtained by the block divider 122, and performs linear prediction on each of the sub blocks by using the corresponding linear prediction coefficient. In detail, the prediction performing unit 123 respectively performs linear prediction on the sub blocks obtained by the block divider 122 by using different linear prediction coefficients.

For example, if the block divider 122 directly outputs the 16×16 block, the prediction performing unit 123 may perform prediction on the 16×16 block by using the same linear prediction coefficient. If the block divider 122 divides and outputs the 16×16 block as two 4×4 blocks and an 8×8 block, the prediction performing unit 123 may respectively perform prediction on the two 4×4 blocks and the 8×8 block by using three different linear prediction coefficients.

If the prediction unit determiner 121 determines linear prediction to be performed in units of lines, the prediction performing unit 123 calculates a linear prediction coefficient for each line included in the current block, and performs linear prediction on each of the lines by using the corresponding linear prediction coefficient. In detail, the prediction performing unit 123 respectively performs linear prediction on the lines included in the current block by using different linear prediction coefficients. For example, if the current block is a 4×4 pixel block, the current block may include first through fourth lines. The prediction performing unit 123 may respectively perform linear prediction on the first through fourth lines by using first through fourth linear prediction coefficients.

As described above, if linear prediction is performed in units of pixels, the precision of intra prediction can be improved but the amount of calculation increases since transformation is performed in units of pixels. If linear prediction is performed in units of blocks, the prediction of intra prediction may decrease but the amount of calculation decreases since transformation is performed in units of blocks. Thus, according to the current exemplary embodiment, the intra prediction unit 12 can increase the efficiency of intra prediction by adaptively determining a unit of linear prediction as a block or a line and performing linear prediction in the determined units.

Figure 6A:
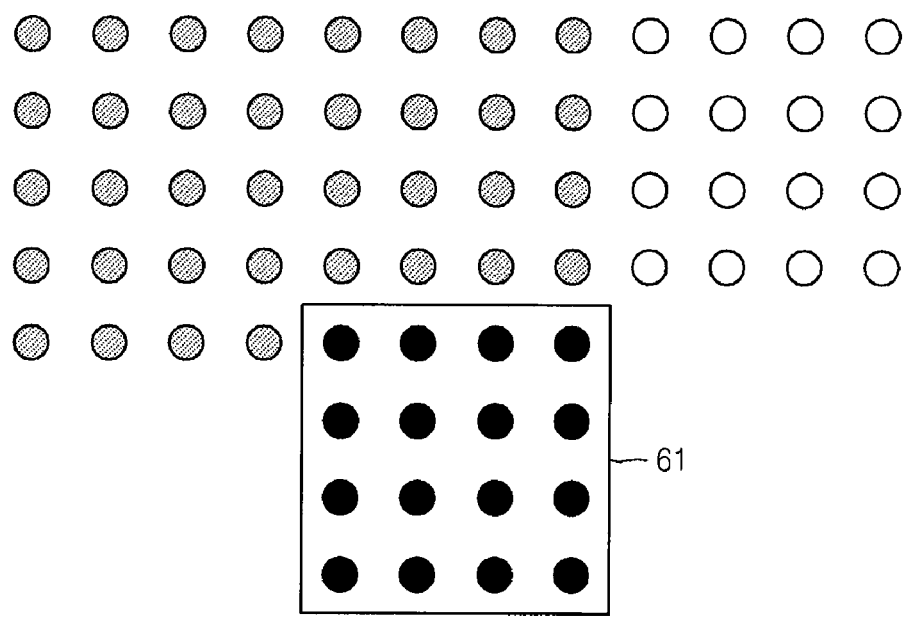
FIGS. 6A and 6B are diagrams illustrating the operation of a prediction performing unit of FIG. 3, according to exemplary embodiments of the present invention.
Figure 6B:
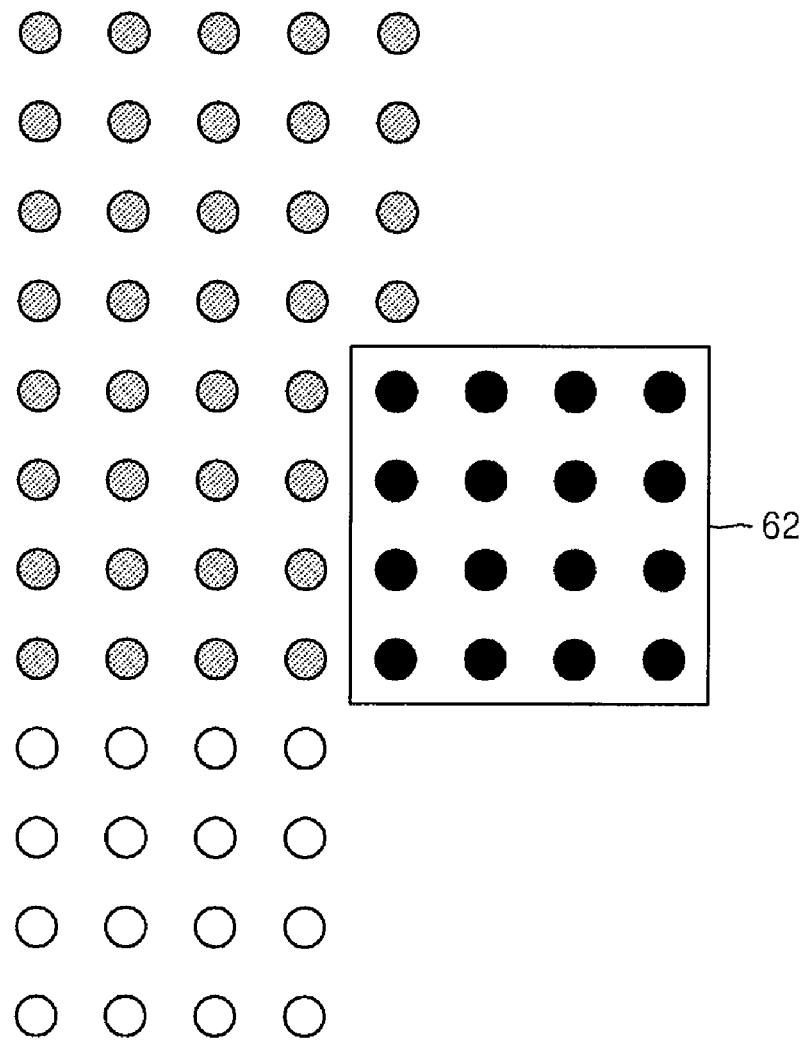

FIGS. 6A and 6B are diagrams illustrating the operation of the prediction performing unit 123 of FIG. 3, according to exemplary embodiments of the present invention. Referring to FIGS. 3 and 6A, the prediction performing unit 123 calculates a linear prediction coefficient of a current block 61, based on a training window that is a set of reconstructed pixels adjacent to the current block 61. Since there is a similarity between a pixel value of the current block 61 and pixel values of blocks adjacent to the current block, the adjacent blocks are set as a training window, and the linear prediction coefficient of the current block 61 is calculated using pixels included in the training window, when linear prediction is performed. Also, the prediction performing unit 123 may perform linear prediction on pixels included in the current block 61 in the order of horizontal scanning, by using the linear prediction coefficient.

Referring to FIG. 6A, the current block 61 consists of 4×4 pixels indicated in black, and a training window including pixels indicated in grey represents pixels reconstructed prior to performing intra prediction on the current block 61. Reconstruction of a training window including pixels indicated in white illustrated in FIG. 6A may not be completed when performing intra prediction on the current block 61. Only if reconstruction of the training window including the pixels indicated in white is completed, it is used as a training window.

Referring to FIGS. 3 and 6A, the prediction performing unit 123 calculates a linear prediction coefficient of a current block 62, based on a training window that is a set of reconstructed pixels adjacent to a current block 62. Also, the prediction performing unit 123 may perform linear prediction on pixels included in the current block 61 in the order of vertical scanning, by using the linear prediction coefficient.

Referring to FIG. 6B, the current block 62 consists of 4×4 pixels indicated in black, and a training window including pixels indicated in grey represents pixels reconstructed prior to performing intra prediction on the current block 62. Reconstruction of a training window including pixels indicated in white illustrated in FIG. 6B may not be completed when performing intra prediction on the current block 62. Only if reconstruction of the training window including the pixels indicated in white is completed, is it used as a training window.

Figure 7A:
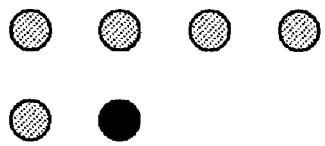
FIGS. 7A through 7C are diagrams illustrating the constructions of pixels available for linear prediction from among pixels included in a training window of FIG. 6A, according to exemplary embodiments of the present invention.
Figure 7B:
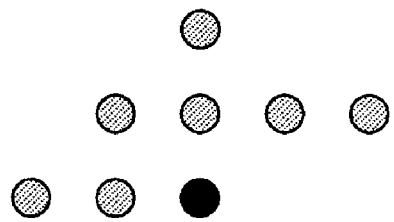
Figure 7C:
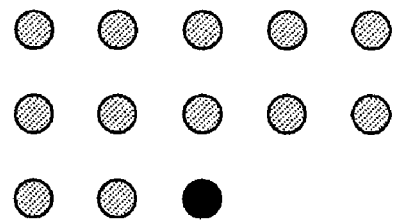

FIGS. 7A through 7C are diagrams illustrating the constructions of pixels_available for linear prediction from among the pixels included in the training window of FIG. 6A, according to exemplary embodiments of the present invention. Referring to FIGS. 3, 6A and 7A through 7C, a current pixel is indicted in black and reconstructed pixels adjacent to the current pixel are indicated in grey. As illustrated in FIG. 6A, if intra prediction is performed on the current block in the order of horizontal scanning, the prediction performing unit 123 does not calculate a linear prediction coefficient of the current block by using all the pixels included in the training window, but calculates the linear prediction coefficient of the current block based on some of the pixels included in the training window, as illustrated in FIG. 7A, 7B, or 7C. In this case, some pixels may be selected from among all the pixels included in the training window, according to the order of scanning the current block.

As illustrated in FIG. 7A, when the linear prediction coefficient of the current block is calculated based on a small number of pixels, the amount of calculation is small but the precision of intra prediction may decrease. In general, the linear prediction coefficient of the current block is calculated using a small number of pixels. As illustrated in FIG. 7C, when the linear prediction coefficient of the current block is calculated based on a large number of pixels, the precision of intra prediction can be improved but the amount of calculation is large. Accordingly, the linear prediction coefficient of the current block is calculated using a number of pixels selected depending on whether an edge is present in the current block, the direction of an edge, or a variation in brightness.

Figure 8A:
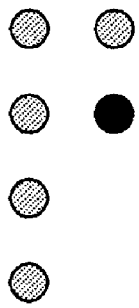
FIGS. 8A through 8C are diagrams illustrating the constructions of pixels available for linear prediction from among pixels included in a training window of FIG. 6B, according to exemplary embodiments of the present invention.
Figure 8B:
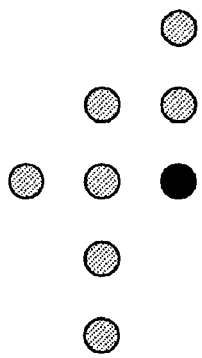
Figure 8C:
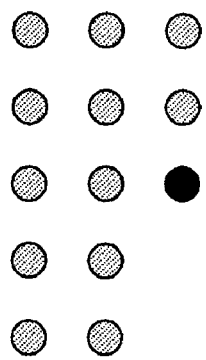

FIGS. 8A through 8C are diagrams illustrating the constructions of pixels available for linear prediction from among the pixels included in the training window of FIG. 6B, according to exemplary embodiments of the present invention. Referring to FIGS. 3, 6B and 8A through 8C, a current pixel is indicated in black, and reconstructed pixels adjacent to the current pixel are indicated in grey. As illustrated in FIG. 6B, when intra prediction is performed on the current block in the order of vertical scanning, the prediction performing unit 123 does not calculate a linear prediction coefficient of the current block by using all the pixels included in the training window, but calculates the linear prediction coefficient of the current block based on some pixels selected from among the pixels included in the training window, as illustrated in FIG. 8A, 8B or 8C. In this case, some pixels may be selected from among all the pixels included in the training window according to the order of scanning the current block.

As illustrated in FIG. 8A, when the linear prediction coefficient of the current block is calculated based on a small number of pixels, the amount of calculation is small although the precision of intra prediction may decrease. In general, the linear prediction coefficient of the current block is calculated based on a small number of pixels. As illustrated in FIG. 8C, when the linear prediction coefficient of the current block is calculated based on a large number of pixels, the precision of intra prediction can be improved but the amount of calculation is large. Thus, the linear prediction coefficient of the current block is calculated using a number of pixels selected depending on whether an edge is present in the current block, the direction of an edge, or a variation in brightness.

Figure 9:
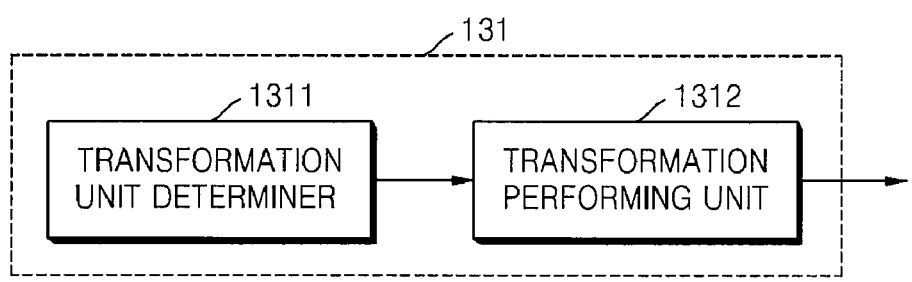
FIG. 9 is a block diagram illustrating in detail a transformation unit illustrated in FIG. 1.

FIG. 9 is a block diagram illustrating in detail the transformation unit 131 of FIG. 1 according to an exemplary embodiment of the present invention. Referring to FIGS. 1 and 9, the transformation unit 131 includes a transformation unit determiner 1311 and a transformation performing unit 1312, and transforms a residual block received from the subtracter 17 into a frequency component. As described above, the transformation unit 131 can transform the original image into a frequency component by performing DCT on the residual block.

The transformation unit determiner 1311 determines a unit of transformation based on a unit of linear prediction determined by the prediction unit determiner 121. More specifically, if the prediction unit determiner 121 determines linear prediction to be performed in units of blocks, the transformation unit determiner 1311 determines a unit of transformation according to the sizes of the blocks. For example, if a unit of linear prediction is a block including a 4×4 pixel, the size of the residual block is also 4×4, and thus, the transformation unit determiner 1311 transforms the 4×4 pixel block into a frequency component. If a unit of linear prediction is a block including 2×2 pixels, the size of the residual block is also 2×2, and thus, the transformation unit determiner 1311 transforms the 2×2 pixel block into a frequency component.

If the prediction unit determiner 121 determines linear prediction to be performed in units of lines, the transformation unit determiner 1311 performs transformation in units of lines. For example, if the current block includes a 4×4 pixel, the current block includes four lines. Thus, when linear prediction is performed on each of the four lines, the size of the residual block is 1×4. In this case, the transformation unit determiner 1311 performs 1D transformation on the 1×4 pixel block to transform it into a frequency component.

The transformation performing unit 1312 transforms the residual block into a frequency component according to the unit of transformation determined by the transformation unit determiner 1311. As described above, the transformation performing unit 1312 can transform the original image into a frequency component by performing DCT on the residual block.

Figure 10:
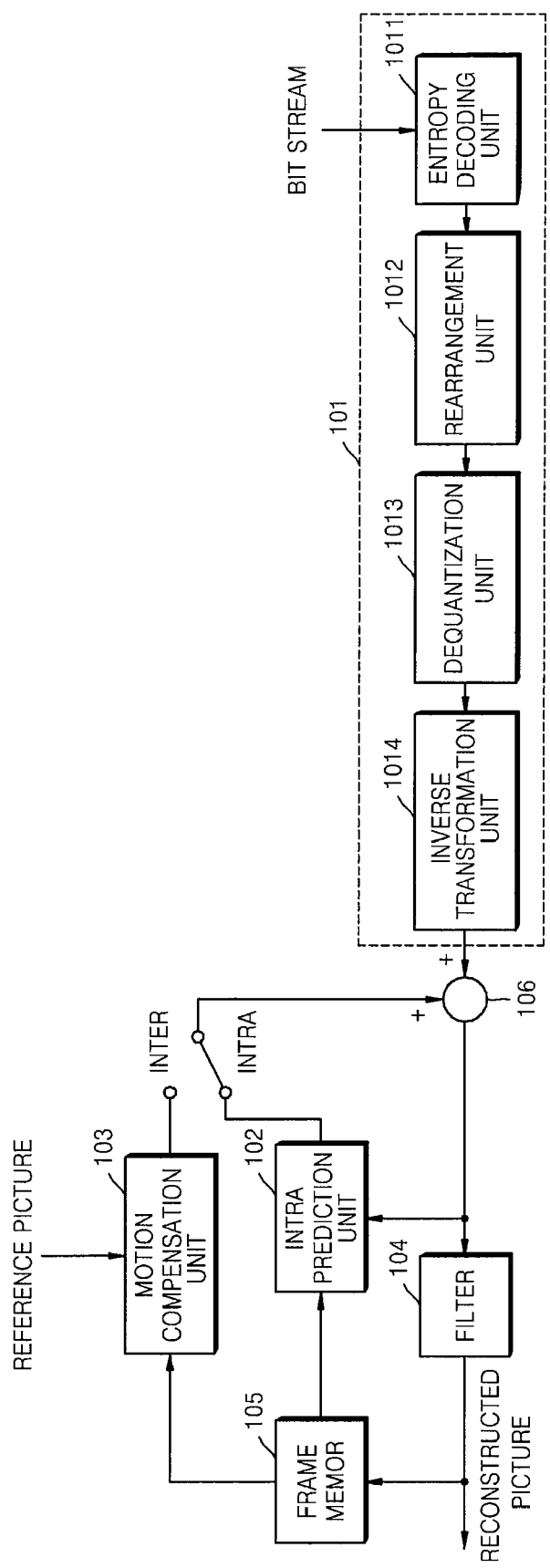
FIG. 10 is a block diagram of an image decoding apparatus including an intra prediction-based decoding apparatus according to an exemplary embodiment of the present invention.

FIG. 10 is a block diagram of an image decoding apparatus including an intra prediction-based decoding apparatus according to an exemplary embodiment of the present invention. Referring to FIG. 10, the image decoding apparatus includes a decoding unit 101, an intra prediction unit 102, a motion compensation unit 103, a filter 104, a frame memory 105, and an adder 106. Here, the decoding unit 101 and the intra prediction unit 102 correspond to an intra prediction-based decoding apparatus according to an exemplary embodiment of the present invention.

The decoding unit 101 includes an entropy decoding unit 1011, a rearrangement unit 1012, a dequantization unit 1013, and an inverse transformation unit 1014. The decoding unit 101 reconstructs a residual block that is the difference between a current block and a predicted block by decoding a received bitstream. The decoding unit 101 also reconstructs information regarding units in which intra prediction was performed on the current block and information regarding block size, by decoding the bitstream. In addition, the decoding unit 101 can reconstruct transformation encoding coefficients, motion vector information, header information, etc. The operation of the inverse transformation unit 1014 will be described in detail later with reference to FIG. 12.

The motion compensation unit 103 performs motion compensation based on a reconstructed picture stored in the frame memory 105, and uses a predicted value obtained by performing motion compensation as a predicted block for the current block.

The intra prediction unit 102 performs intra prediction on the current block, based on the reconstructed picture stored in the frame memory 105, and the information regarding the unit of intra prediction and the information regarding block size, which are reconstructed by the decoding unit 101. The operation of the intra prediction unit 102 will be described in detail later with reference to FIG. 11.

The adder 106 reconstructs the current block by combining a predicted block received from the motion compensation unit 103 or the intra prediction unit 102 and the residual block reconstructed by the decoding unit 101. The reconstructed current block is stored in the frame memory 105 via the filter 104.

Figure 11:
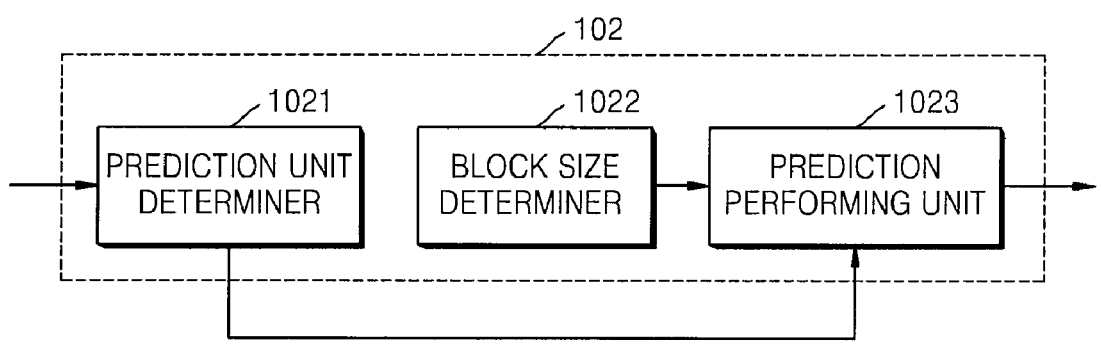
FIG. 11 is a block diagram illustrating in detail an intra prediction unit illustrated in FIG. 10.

FIG. 11 is a block diagram illustrating in detail the intra prediction unit 102 of FIG. 10 according to an exemplary embodiment of the present invention. Referring to FIGS. 10 and 11, the intra prediction unit 102 includes a prediction unit determiner 1021, a block size determiner 1022, and a prediction performing unit 1023.

The prediction unit determiner 1021 determines whether linear prediction is to be performed on a current block in units of blocks or in units of lines included in the current block, based on intra prediction unit information. When a decoding terminal reconstructs the original image, intra prediction must be performed in the same type of units as the units in which an encoding terminal has performed linear prediction, and therefore, the intra prediction unit information must be referred to.

If the prediction unit determiner 1021 determines linear prediction to be performed in units of blocks, the block size determiner 1022 determines the size of the current block on which linear prediction is to be performed, based on block size information. The encoding terminal may have respectively performed linear prediction on different sized blocks using different linear prediction coefficients. Thus, the decoding terminal refers to information regarding the size of a block in which the encoding terminal has performed linear prediction.

If the prediction unit determiner 1021 determines linear prediction to be performed in units of blocks, the prediction performing unit 1023 calculates a linear prediction coefficient of each of blocks whose sizes are determined by the block size determiner 1022, and generates a predicted block by performing intra prediction on each of the blocks by using the corresponding linear prediction coefficient. In other words, the prediction performing unit 1023 calculates the same linear prediction coefficient for the current block, and performs intra prediction on pixels included in the current block by using the same linear prediction coefficient.

If the prediction unit determiner 1022 determines linear prediction to be performed in units of lines, the prediction performing unit 1023 calculates linear prediction coefficients for respective lines included in the current block, and generates predicted values of the respective lines by performing intra prediction in units of lines by using the prediction coefficients. In other words, the prediction performing unit 1023 calculates different linear prediction coefficients for the respective lines, and performs intra prediction on pixels in one of the lines by using the same linear prediction coefficient.

Figure 12:
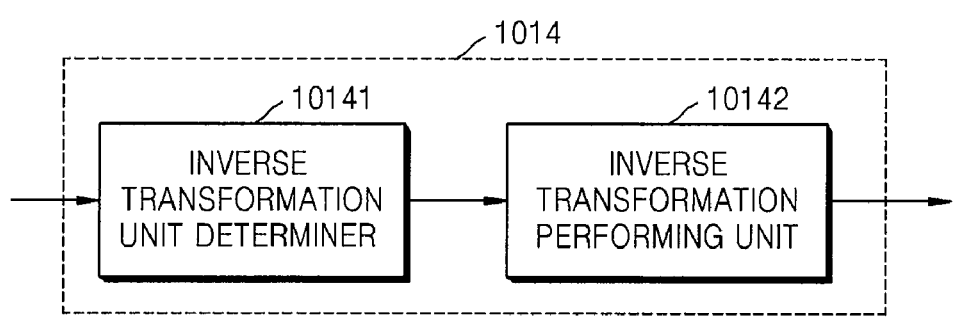
FIG. 12 is a block diagram illustrating in detail an inverse transformation unit illustrated in FIG. 10.

FIG. 12 is a block diagram illustrating in detail the inverse transformation unit 1014 of FIG. 10 according to an exemplary embodiment of the present invention. Referring to FIGS. 10 and 12, the inverse transformation unit 1014 includes an inverse transformation unit determiner 10141 and an inverse transformation performing unit 10142.

The inverse transformation unit determiner 10141 determines a unit of inverse transformation, based on intra prediction unit information. More specifically, if the intra prediction unit information reveals that an encoding terminal performed intra prediction in units of blocks, the inverse transformation unit determiner 10141 determines inverse transformation to be also performed in units of blocks. If the intra prediction unit information reveals that the encoding terminal performed intra prediction in units of lines, the inverse transformation unit determiner 10141 determines inverse transformation to be also performed in units of lines.

The inverse transformation performing unit 10142 inversely transforms the result of dequantizing received from the dequantization unit 1013 into the original image by performing inverse DCT thereon, according to the unit of inverse transformation determined by the inverse transformation unit determiner 10141. In detail, if the unit of inverse transformation determined by the inverse transformation unit determiner 10141 is a block, the inverse transformation performing unit 10142 inversely transforms the result of dequantizing into the original image by performing inverse DCT in units of blocks. If the unit of inverse transformation determined by the inverse transformation unit determiner 10141 is a line, the inverse transformation performing unit 10142 inversely transforms the result of dequantizing into the original image by performing inverse DCT in units of lines.

Figure 13:
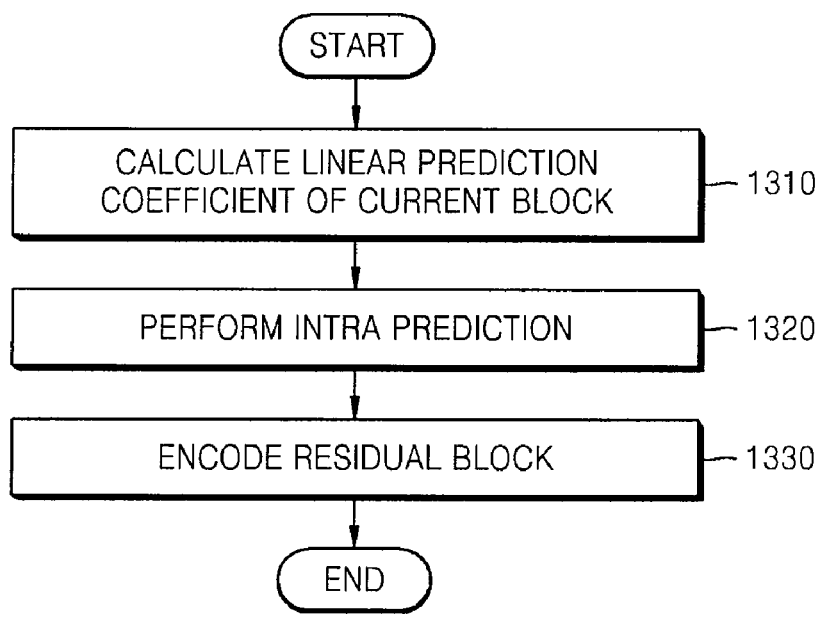
FIG. 13 is a flowchart illustrating an intra prediction-based encoding method according to an exemplary embodiment of the present invention.

FIG. 13 is a flowchart illustrating an intra prediction-based encoding method according to an exemplary embodiment of the present invention. Referring to FIG. 13, the intra prediction-based encoding method includes operations to be sequentially performed by the intra prediction-based encoding apparatus illustrated in FIG. 1. Thus, although not described here, the above description of the intra prediction-based encoding apparatus of FIG. 1 can also be applied to the intra prediction-based encoding method of FIG. 13.

In operation 1310, the intra prediction unit 12 calculates a linear prediction coefficient of a current block, based on encoded blocks adjacent to the current block. Here, calculation of a linear prediction coefficient may be performed in units of blocks or lines. Also, the size of a block may vary.

In operation 1320, the intra prediction unit 12 generates a predicted block by performing intra prediction on the current block by using the linear prediction coefficient.

In operation 1330, the encoding unit 13 encodes a residual block that is the difference between the current block and the predicted block.

Figure 14:
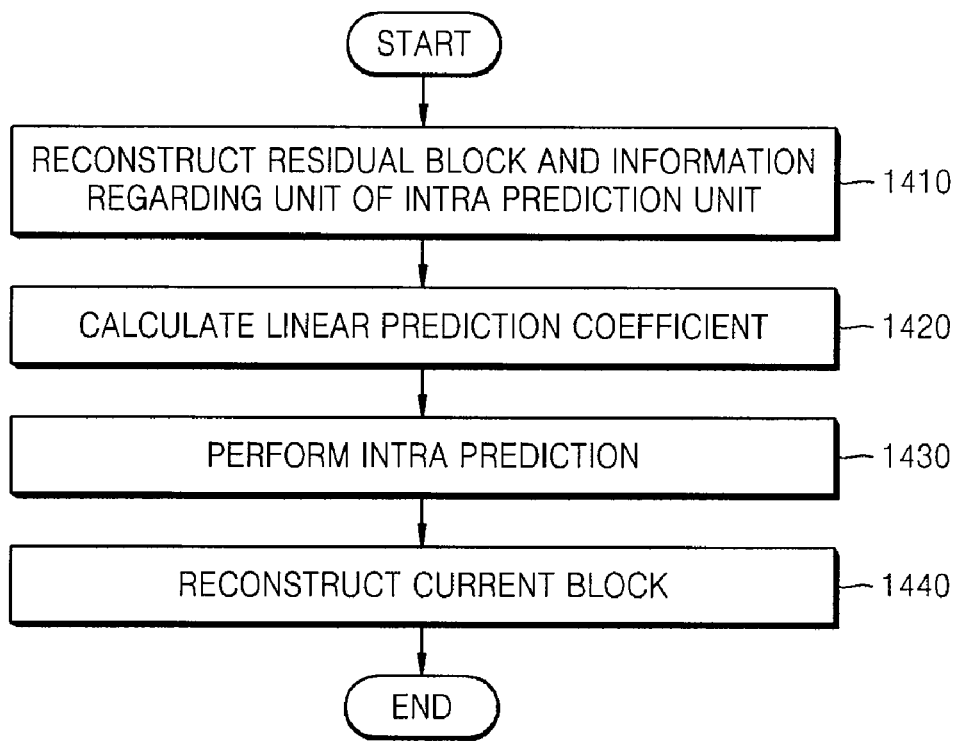
FIG. 14 is a flowchart illustrating an intra prediction-based decoding method according to an exemplary embodiment of the present invention.

FIG. 14 is a flowchart illustrating an intra prediction-based decoding method according to an exemplary embodiment of the present invention. Referring to FIG. 14, the intra prediction-based decoding method includes operations to be sequentially performed by the intra prediction-based decoding apparatus of FIG. 10. Thus, although not described here, the above description of the intra prediction-based decoding apparatus of FIG. 10 can also be applied to the intra prediction-based decoding method of FIG. 14.

In operation 1410, the decoding unit 101 reconstructs a residual block that is the difference between a current block and a predicted block, and information regarding units in which intra prediction was performed on the current block, from a bitstream.

In operation 1420, the intra prediction unit 102 calculates a linear prediction coefficient of the current block or in units of lines included in the current block according to the information regarding the units in which the intra prediction was performed, based on reconstructed blocks adjacent to the current block.

In operation 1430, the intra prediction unit 102 generates a predicted block by performing intra prediction on the current block or in units of lines by using the linear prediction coefficient.

In operation 1440, the adder 106 reconstructs the current block by combining the predicted block and the reconstructed residual block.

The system according to the present invention can be embodied as computer readable code in a computer readable storage medium. Here, the computer readable storage medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Additionally, the present invention may be embodied as a computer readable transmission medium. The computer readable transmission medium may be a carrier wave that transmits data via the Internet, for example. The computer readable storage medium and computer readable transmission medium can be distributed among computer systems that are interconnected through a network, and the present invention may be stored and implemented as computer readable code in the distributed system.

According to the above exemplary embodiments of the present invention, a linear prediction coefficient of a current block is calculated based on encoded blocks adjacent to the current block, and intra prediction is performed on the current block by using the linear prediction coefficient. Accordingly, a need to additionally transmit information regarding a direction in which intra prediction is performed is reduced, thereby reducing the amount of bits that are to be transmitted.

Also, linear prediction is performed by calculating a linear prediction coefficient of a current block in units of blocks or in units of lines included in a block, and transformation is performed to correspond to the result of performing linear prediction. Accordingly, it is possible to improve the quality of an image by adaptively controlling the efficiency and precision of intra prediction according to the characteristics of the current block.

While this invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. An intra prediction-based encoding method comprising:
   obtaining a linear prediction coefficient of a current block, based on encoded blocks adjacent to the current block;
   generating a predicted block by performing intra prediction on the current block by using the linear prediction coefficient; and
   encoding a residual block that is a difference between the current block and the predicted block,
   wherein the obtaining the linear prediction coefficient comprises determining whether the obtaining the linear prediction coefficient is to be performed in units of blocks or units of lines based on at least one of a variation in brightness within the current block and a variation in chrominance within the current block.

2. The method of claim 1, wherein the obtaining of the linear prediction coefficient comprises obtaining the linear prediction coefficient of the current block or obtaining the linear prediction coefficient in units of lines included in the current block, based on the encoded blocks adjacent to the current block.

3. The method of claim 1, wherein the obtaining of the linear prediction coefficient comprises:
   dividing the current block into a plurality of sub blocks of various sizes; and
   obtaining a plurality of linear prediction coefficients for the respective sub blocks.

4. The method of claim 3, wherein the generating of the predicted block comprises generating a plurality of predicted blocks by performing intra prediction on the sub blocks in an order of sequential scanning, by using the linear prediction coefficients.

5. The method of claim 4, wherein the encoding of the residual block comprises:
   generating a plurality of residual blocks by respectively subtracting the predicted blocks from the current block;
   transforming the residual blocks into frequency components; and
   encoding the frequency components.

6. The method of claim 1, wherein the generating of the obtaining of the linear prediction coefficient comprises obtaining a plurality of linear prediction coefficients in units of lines included in the current block, and
   wherein the generating of the predicted block comprises generating a plurality of predicted blocks by performing intra prediction in units of lines in an order of sequential scanning, by using the linear prediction coefficients.

7. The method of claim 6, wherein the encoding of the residual block comprises:
   generating a plurality of residual blocks in units of lines by respectively subtracting predicted blocks generated in units of lines from the current block;
   transforming the residual blocks in units of lines into frequency components; and
   encoding the frequency components.

8. A non-transitory computer readable storage medium having recorded thereon a computer program for executing an intra prediction-based encoding method, the method comprising:
   obtaining a linear prediction coefficient of a current block, based on encoded blocks adjacent to the current block;
   generating a predicted block by performing intra prediction on the current block by using the linear prediction coefficient; and
   encoding a residual block that is a difference between the current block and the predicted block,
   wherein the obtaining the linear prediction coefficient comprises determining whether the obtaining the linear prediction coefficient is to be performed in units of blocks or units of lines based on at least one of a variation in brightness within the current block and a variation in chrominance within the current block.

9. An intra prediction-based decoding method comprising:
   reconstructing a residual block that is a difference between a current block and a predicted block and reconstructing information regarding a unit of intra prediction that has been performed on the current block, from a bitstream;
   obtaining a linear prediction coefficient of the current block or in units of lines included in the current block, according to the information regarding the unit of intra prediction, based on encoded blocks adjacent to the current block;
   generating the predicted block by performing intra prediction on the current block or in units of lines by using the linear prediction coefficient; and reconstructing the current block by combining the predicted block and the reconstructed residual block, wherein the information regarding the unit of intra prediction is generated based on at least one of a variation in brightness within the current block and a variation in chrominance within the current block.

10. The method of claim 9, wherein the reconstructing of the residual block and the unit of intra prediction comprises:
    decoding the residual block and the information regarding the unit of intra prediction from the bitstream; and
    inversely transforming the residual block of the current block or in units of lines into an original image, based on the information regarding the unit of intra prediction.

11. The method of claim 9, wherein the reconstructing of the residual block and the unit of intra prediction comprises:
    reconstructing the residual block, the information regarding the unit of intra prediction, and block size information, from the bitstream, and
    wherein the obtaining of the linear prediction coefficient comprises:
    dividing the current block into a plurality of sub blocks of various sizes, based on the block size information; and
    obtaining a plurality of linear prediction coefficients for the respective sub blocks.

12. The method of claim 11, wherein the generating of the predicted block comprises generating a plurality of predicted blocks by performing intra prediction on the sub blocks in an order of sequential scanning, by using the linear prediction coefficients.

13. The method of claim 9, wherein the obtaining of the linear prediction coefficient comprises obtaining a plurality of linear prediction coefficients in units of lines included in the current block, and
    the generating of the predicted block comprises generating a plurality of predicted blocks by performing intra prediction in units of lines in an order of sequential scanning, by using the linear prediction coefficients.

14. A non-transitory computer readable storage medium having recorded thereon a computer program for executing an intra prediction-based decoding method, the method comprising:
    reconstructing a residual block that is a difference between a current block and a predicted block and reconstructing information regarding a unit of intra prediction that has been performed on the current block, from a bitstream;
    obtaining a linear prediction coefficient of the current block or in units of lines included in the current block according to the information regarding the unit of intra prediction, based on encoded blocks adjacent to the current block;
    generating a predicted block by performing intra prediction on the current block or in units of lines by using the linear prediction coefficient; and
    reconstructing the current block by combining the predicted block and the reconstructed residual block,
    wherein the information regarding the unit of intra prediction is generated based on at least one of a variation in brightness within the current block and a variation in chrominance within the current block.

15. An intra prediction-based encoding apparatus comprising:
    an intra prediction unit which obtains a linear prediction coefficient of a current block based on encoded blocks adjacent to the current block, and which generates a predicted block by performing intra prediction on the current block by using the linear prediction coefficient; and
    an encoding unit which encodes a residual block that is a difference between the current block and the predicted block,
    wherein the intra prediction unit determining whether the obtaining the linear prediction coefficient is to be performed in units of blocks or units of lines based on at least one of a variation in brightness within the current block and a variation in chrominance within the current block.

16. The apparatus of claim 15, wherein the intra prediction unit comprises:
    a prediction unit determiner which determines whether linear prediction is to be performed on the current block or in units of line included in the current block;
    a block divider which divides the current block into at least one sub block of a predetermined size, if it is determined that linear prediction is to be performed on the current block; and
    a prediction performing unit which obtains a linear prediction coefficient in a unit determined by the prediction unit determiner, and which performs intra prediction on the current block by using the linear prediction coefficient.

17. The apparatus of claim 16, wherein the encoding unit comprises:
    a transformation unit which transforms the residual block into a frequency component according to the unit determined by the prediction unit determiner; and
    a quantization and encoding unit which quantizes and encodes a result of the transforming.

18. An intra prediction-based decoding apparatus comprising:
    a decoding unit which reconstructs a residual block that is a difference between a current block and a predicted block and which reconstructs information regarding a unit of intra prediction that has been performed on the current block, from a bitstream;
    an intra prediction unit which obtains a linear prediction coefficient of the current block or in units of lines included in the current block according to the information regarding the unit of intra prediction, based on encoded blocks adjacent to the current block, and which generates a predicted block by performing intra prediction on the current block or in units of lines by using the linear prediction coefficient; and
    an adder which reconstructs the current block by combining the predicted block and the reconstructed residual block,
    wherein the information regarding the unit of intra prediction is generated based on at least one of a variation in brightness within the current block and a variation in chrominance within the current block.

19. The apparatus of claim 18, wherein the decoding unit reconstructs the residual block and the information regarding the unit of intra prediction by decoding the bitstream, and inversely transforms the residual block into an original image in a unit of inverse transformation determined based on the information regarding the unit of intra prediction.

20. The apparatus of claim 19, wherein the decoding unit reconstructs the residual block, the information regarding the unit of intra prediction, and block size information, from the bitstream, and
    the intra prediction unit comprises:
    a prediction unit which determines a unit in which linear prediction is to be performed on the current block or in units of lines included in the current block, based on the information regarding the unit of intra prediction;

a block size determinator which determines a size of the current block based on the block size information, if it is determined that linear prediction is to be performed on a unit of the current block; and a prediction performing unit which obtains the linear prediction coefficient of the current block or in units of lines, based on the encoded blocks adjacent to the current block, and which performs intra prediction on the current block or in units of lines by using the linear prediction coefficient.

* * * * *